United States Patent
Lee et al.

(10) Patent No.: US 9,550,324 B2
(45) Date of Patent: Jan. 24, 2017

(54) THREE DIMENSIONAL PRINTING APPARATUS, PRINTING CALIBRATION BOARD AND THREE DIMENSIONAL PRINTING CALIBRATION METHOD THEREOF

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Yang-Teh Lee, New Taipei (TW); Chi-Wen Hsieh, New Taipei (TW); Chi-Chieh Wu, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 268 days.

(21) Appl. No.: 14/324,256

(22) Filed: Jul. 7, 2014

(65) Prior Publication Data

US 2015/0321426 A1    Nov. 12, 2015

(30) Foreign Application Priority Data

May 8, 2014  (TW) .............................. 103116407 A

(51) Int. Cl.
*B29C 67/00* (2006.01)
*B33Y 10/00* (2015.01)
(Continued)

(52) U.S. Cl.
CPC ....... *B29C 67/0059* (2013.01); *B29C 67/0055* (2013.01); *B29C 67/0088* (2013.01);
(Continued)

(58) Field of Classification Search
CPC ............ B29C 67/0051; B29C 67/0055; B29C 67/0088
(Continued)

(56) References Cited

U.S. PATENT DOCUMENTS 5,121,329 A * 6/1992 Crump ................ B29C 67/0055
                                                          425/174.4
7,680,555 B2 * 3/2010 Dunn .................. B29C 67/0088
                                                          700/119
(Continued)

FOREIGN PATENT DOCUMENTS

CN           103317846           9/2013

OTHER PUBLICATIONS

"Office Action of China Counterpart Application", issued on Nov. 2, 2016, p. 1-p. 8.

*Primary Examiner* — Joseph S. Del Sole
*Assistant Examiner* — Thukhanh T Nguyen
(74) *Attorney, Agent, or Firm* — Jianq Chyun IP Office

(57) ABSTRACT

A three-dimensional (3D) printing apparatus, a printing calibration board and a three dimensional printing calibration method thereof are provided. The three-dimensional printing apparatus is adapted to spray the printing material. The three-dimensional printing apparatus includes a nozzle module, a printing platform and a control unit. The printing platform has a carrying surface, where the calibration pattern is disposed on the carrying surface. The calibration pattern at least includes a datum path and a first auxiliary path. The control unit controls the nozzle module coupled to the control unit to spray the printing material along the datum path, and the printing speed of the nozzle module is adjusted in response to the width of coverage of the printing material on the calibration pattern.

13 Claims, 7 Drawing Sheets

(51) Int. Cl.
*B33Y 50/02* (2015.01)
*B33Y 40/00* (2015.01)

(52) U.S. Cl.
CPC ............... *B33Y 10/00* (2014.12); *B33Y 40/00* (2014.12); *B33Y 50/02* (2014.12)

(58) Field of Classification Search
USPC ........................................................ 425/375
See application file for complete search history.

(56) References Cited

U.S. PATENT DOCUMENTS 9,205,690 B2 * 12/2015 Leavitt ................ B29C 67/0055
2014/0265040 A1 * 9/2014 Batchelder .......... B29C 67/0055
425/113

* cited by examiner

THREE DIMENSIONAL PRINTING APPARATUS, PRINTING CALIBRATION BOARD AND THREE DIMENSIONAL PRINTING CALIBRATION METHOD THEREOF

CROSS-REFERENCE TO RELATED APPLICATION

This application claims the priority benefit of Taiwan application serial no. 103116407, filed on May 8, 2014. The entirety of the above-mentioned patent application is hereby incorporated by reference herein and made a part of this specification.

BACKGROUND OF THE DISCLOSURE

1. Field of the Disclosure

The disclosure relates to a printing apparatus, and particularly relates to a three-dimensional printing apparatus, a printing calibration board thereof, and a three-dimensional printing calibration method thereof.

2. Description of Related Art

Along with the progress of computer-aided manufacturing (CAM), the manufacturing industry developed a technology of three-dimensional printing, by which an initial design idea can be quickly implemented. In fact, the technology of three-dimensional printing is a general designation of a series of rapid prototyping (RP) technologies, which is based on a process of stacked layers and uses an RP machine to form the cross-sections of a work-piece through scanning in an X-Y plane meanwhile makes moving for a layer thickness step-by-step along the Z coordinate so as to finally finish a three-dimensional object.

However, in the technology of three-dimensional printing, the viscosity of printing material has a great influence on the precision in shaping the printing material. More specifically, materials having different viscosities need to be printed with the corresponding printing speeds, so as to prevent the printed object from being distorted. For example, the proportions of ingredients in mashed or slurry-like edible printing materials such as doughs are usually prepared by the user, and the viscosity of the printing material may change as the environmental factors (e.g. temperature) change. Therefore, how to choose or calibrate the printing speed of three-dimensional printing based on the viscosities of printing materials is certainly an issue for artisans in this field to work on.

SUMMARY OF THE DISCLOSURE

The disclosure provides a three-dimensional printing apparatus, a printing calibration board, and a three-dimensional printing calibration method thereof capable of choosing and calibrating a printing speed based on a viscosity of a printing material.

The disclosure provides a three-dimensional printing apparatus. The three-dimensional printing apparatus includes a nozzle module, a printing platform, and a control unit. The printing platform has a carrying surface, and a calibration pattern is disposed on the carrying surface. The calibration pattern at least includes a datum path and a first auxiliary path. A first datum line and a second datum line are arranged to be spaced with a distance to form the datum path. In addition, a first auxiliary line is arranged to be spaced with a distance from one side of the datum path to from the first auxiliary path. The control unit is coupled to the nozzle module. The control unit controls the nozzle module to spray the printing material along the datum path, and correspondingly adjusts the printing speed of the nozzle module in response to a width of coverage of the printing material on the calibration pattern.

The disclosure provides a printing calibration board adapted to be configured with a nozzle module that sprays a printing material. The printing calibration board includes a substrate and a calibration pattern. The calibration pattern is disposed on the substrate, and at least includes a datum path and a first auxiliary path. A first datum line and a second datum line are arranged to be spaced with a distance to form the datum path. In addition, a first auxiliary line is arranged to be spaced with a distance from one side of the datum path to from the first auxiliary path. Accordingly, the nozzle module sprays the printing material along the datum path and the first auxiliary path to present a width of coverage.

The disclosure provides a three-dimensional printing calibration method adapted to calibrate a printing speed of a nozzle module. The three-dimensional printing calibration method includes steps as follows. A calibration pattern at least including a datum path and a first auxiliary path is provided. The nozzle module sprays the printing material along the datum path. In addition, the printing speed of the nozzle module is correspondingly adjusted in response to a width of coverage of the printing material on the calibration pattern.

Based on the above, in the embodiments of the disclosure, the three-dimensional printing apparatus sprays the printing material on the calibration pattern and calibrates the printing speed of the nozzle module in response to the width of coverage of the printing material on the calibration pattern. Since the width of coverage of the printing material on the calibration pattern may serve as the basis to determine whether the current printing speed is appropriate, the three-dimensional printing apparatus may choose and calibrate the printing speed based on the viscosity of the printing material.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Descriptions of the disclosure are given with reference to the exemplary embodiments illustrated with accompanied drawings. In addition, whenever possible, identical or similar reference numbers stand for identical or similar elements in the figures and the embodiments.

Figure 1A:
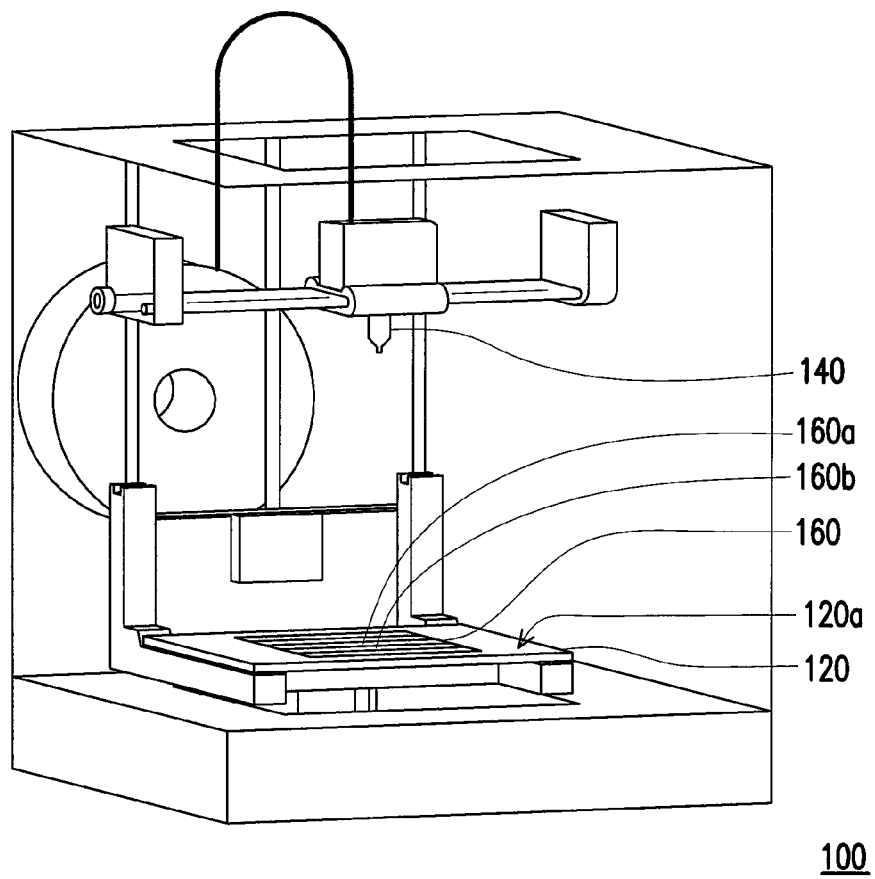
FIG. 1A is a partial schematic view illustrating a three-dimensional printing apparatus according to an embodiment of the disclosure.
Figure 1B:
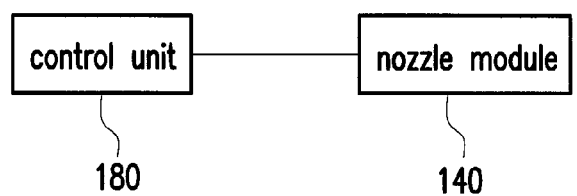
FIG. 1B is a partial schematic block diagram illustrating a three-dimensional printing apparatus according to an embodiment of the disclosure.

FIG. 1A is a partial schematic view illustrating a three-dimensional printing apparatus according to an embodiment of the disclosure. FIG. 1B is a partial schematic block diagram illustrating a three-dimensional printing apparatus according to an embodiment of the disclosure. A three-dimensional printing apparatus 100 is adapted to perform three-dimensional printing according to the user's instruction. More specifically, the three-dimensional printing apparatus 100 may be a food printer, and a printing material thereof may be an edible printing material prepared by the user. Referring to FIGS. 1A and 1B, in this embodiment, the three-dimensional printing apparatus 100 includes a printing platform 120, a nozzle module 140, a calibration pattern 160, and a control unit 180.

In this embodiment, the printing platform 120 has a carrying surface 120a. In addition, the calibration pattern 160 is disposed on the carrying surface 120a. The nozzle module 140 is disposed above the printing platform 120. More specifically, the calibration pattern 160 is disposed between the printing platform 120 and the nozzle module 140, and at least includes a datum path 160a and a first auxiliary path 160b. The control unit 180 is coupled to the nozzle module 140, and is a device having a computing function, such as a central processing unit, a chip set, a microprocessor, an embedded controller, etc. However, the disclosure is not limited thereto. Generally speaking, the control unit 180 controls the nozzle module 140 to perform three-dimensional printing on the printing platform 120 according to the user's instruction. In an embodiment of the disclosure, the control unit 180 further controls the nozzle module 140 to spray the printing material along the datum path 160a, and correspondingly adjusts the printing speed of the nozzle module 140 in response to a width of coverage of the printing material on the calibration pattern 160.

Figure 2:
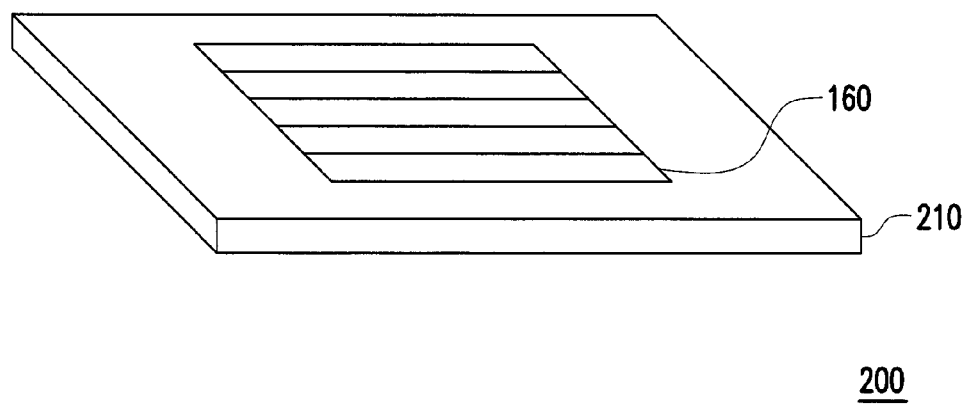
FIG. 2 is a schematic view illustrating a printing calibration board according to an embodiment of the disclosure.

The calibration pattern 160 is disposed in the three-dimensional printing apparatus 100, and mainly serves to determine whether the printing speed of the nozzle module 140 is suitable for the printing material in use. More specifically, since different printing materials may have different viscosities, the three-dimensional printing apparatus 100 determines the printing speed based on the width of coverage of the printing material on the calibration pattern 160. In this embodiment, the calibration pattern 160 is disposed on the carrying surface 120a of the printing platform 120. However, the disclosure is not limited thereto. FIG. 2 is a schematic view illustrating a printing calibration board according to an embodiment of the disclosure. Referring to FIG. 2, in another embodiment, the three-dimensional printing apparatus 100 further includes a printing calibration board 200, and the calibration pattern 160 is disposed on the printing calibration board 200. The printing calibration board 200 is detachably disposed in the three-dimensional printing apparatus 100, for example. More specifically, the printing calibration board 200 includes a substrate 210 and the calibration pattern 160, and the calibration pattern 160 is disposed on the substrate 210. The substrate 210 is disposed on the carrying surface 120a of the printing platform 120 of the three-dimensional printing apparatus 100. When the printing calibration board 200 is disposed between the printing platform 120 and the nozzle module 140, the three-dimensional printing apparatus 100 controls the nozzle module 140 to spray the printing material on the printing calibration board 200 by using the control unit 180. In addition, the printing speed of the nozzle module 140 is calibrated in response to the width of coverage of the printing material on the printing calibration board 200. A plurality of paths, including the datum path 160a and the first auxiliary path 160b in the calibration pattern 160, may be formed of a plurality of lines that are respectively spaced with a distance and arranged in parallel. In other embodiments, the paths in the calibration pattern 160 may be color bands, and adjacent color bands are in different colors.

Figure 3A:
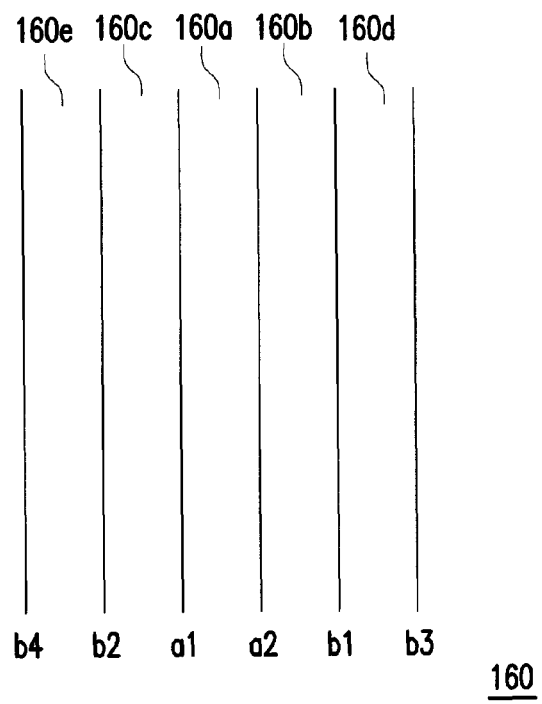
FIGS. 3A and 3B are partial schematic views illustrating calibration patterns according to an embodiment of the disclosure.
Figure 3B:
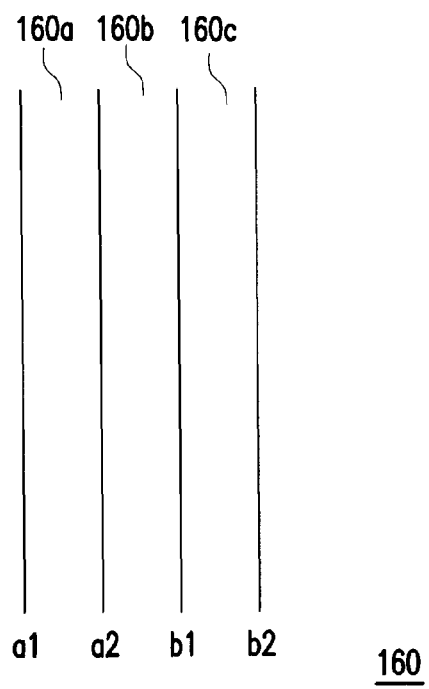

FIGS. 3A and 3B are partial schematic views illustrating calibration patterns according to an embodiment of the disclosure. Referring to FIG. 3A, in an embodiment of the disclosure, the calibration pattern 160 includes the datum path 160a, the first auxiliary path 160b, a second auxiliary path 160c, a third auxiliary path 160d, and a fourth auxiliary path 160e. In this embodiment, a first datum line a1 and a second datum line a2 are arranged to be spaced with a distance to form the datum path 160a. A first auxiliary line b1 is arranged to be spaced with a distance from one side of the datum path 160a to from the first auxiliary path 160b. Similarly, a second auxiliary line b2 is arranged to be spaced with a distance from the other side of the datum path 160a to from the second auxiliary path 160c. A third auxiliary line b3 is arranged to be spaced with a distance from one side of the first auxiliary path 160b to form the third auxiliary path 160d, and a fourth auxiliary line b4 is arranged to be spaced with a distance from one side of the second auxiliary path 160c to form the fourth auxiliary path 160e. Referring to FIG. 3B, in another embodiment of the disclosure, the calibration pattern 160 includes the datum path 160a, the first auxiliary path 160b, and the second auxiliary path 160c. Similarly, the first datum line a1 and the second datum line a2 are arranged to be spaced with a distance to form the datum path 160a. The first auxiliary line b1 is arranged to be spaced with a distance from one side of the datum path 160a to from the first auxiliary path 160b. The second auxiliary line b2 is arranged to be spaced with a distance from one side of the first auxiliary path 160b to from the second auxiliary path 160c. The datum path 160a is arranged on the other side of the first auxiliary path 160b, while the second auxiliary path 160c is arranged on the one side of the first auxiliary path 160b. Compared with the embodiment shown in FIG. 3A, in the calibration pattern 160, only the first auxiliary path 160b and the second auxiliary path 160c are disposed on one side of the datum path 160a. Therefore, an area taken up by the whole calibration pattern 160 is reduced. It should be noted that in an embodiment, widths of the datum path 160a, the first auxiliary path 160b, and the second auxiliary path 160c may be a predetermined width. However, in other embodiments, the widths of the datum path 160a, the first auxiliary path 160b, and the second auxiliary path 160c may be different.

Figure 4A:
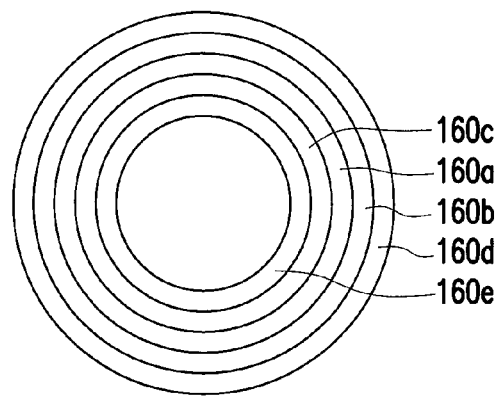
FIGS. 4A to 4C are schematic views illustrating calibration patterns according to an embodiment of the disclosure.
Figure 4B:
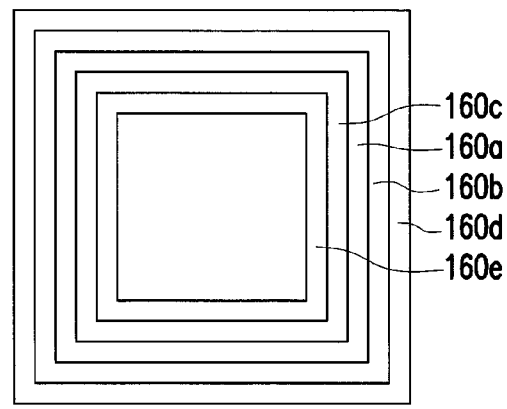
Figure 4C:
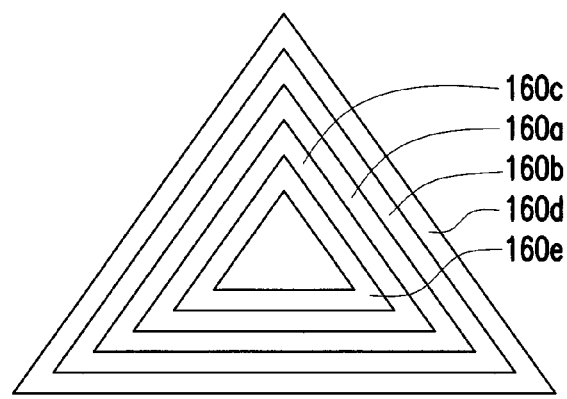

More specifically, the calibration pattern 160 may be arranged as concentrically arranged patterns in a variety of shapes. FIGS. 4A to 4C are schematic views illustrating calibration patterns according to an embodiment of the disclosure. Referring to FIGS. 4A to 4C, the calibration pattern may be enclosed concentrically arranged circular patterns, enclosed concentrically arranged rectangular patterns, enclosed concentrically arranged triangular patterns, or enclosed concentrically arranged irregular patterns (not shown) that are formed of a plurality of paths (the datum path 160a, the first auxiliary path 160b, the second auxiliary path 160c, and the third auxiliary path 160d, and the fourth auxiliary path 160e, for example). More specifically, the calibration pattern 160 may be designed based on the needs in practice, and is not limited to the enclosed concentrically arranged patterns previously described.

The design that the calibration pattern 160 has a plurality of paths helps determine whether the printing speed of the nozzle module 140 is appropriate. When the control unit 180 controls the nozzle module 140 to spray the printing material along the datum path 160a, the width of coverage of the printing material on the calibration pattern 160 may differ in accordance with a nozzle moving speed of the nozzle module 140, a material supplying speed, and the degree of viscosity of the printing material. In other words, the appropriate printing speed may be chosen to prevent the object being printed from being distorted due to different viscosities of different printing materials.

More specifically, the printing speed is influenced by the nozzle moving speed of the nozzle module 140 and the material supplying speed of the printing material. Therefore, at least one of the nozzle moving speed and the material supplying speed may be chosen to calibrate the printing speed. In this embodiment, the nozzle moving speed and the material supplying speed may be categorized into a plurality of categories (five categories, for example) by speed from fastest to slowest, and the categories may be set in the three-dimensional printing apparatus 100. Table 1 is a schematic table showing the nozzle moving speed and the material supplying speed respectively categorized into five categories by speed.

TABLE 1

| | Categories of the nozzle moving speed and the material supplying speed | |
|---|---|---|
| | nozzle moving speed | material supplying speed |
| slowest | M1 | S1 |
| slow | M2 | S2 |
| normal | M3 | S3 |
| fast | M4 | S4 |
| fastest | M5 | S5 |

Generally speaking, the three-dimensional printing apparatus 100 may set an initial nozzle moving speed as M3 and an initial material supplying speed as S3. Then, in response to the width of coverage of the printing material on the calibration pattern 160, the control unit 180 calibrates the printing speed by further adjusting at least one of the nozzle moving speed and the material supplying speed. FIGS. 5A to 5D are schematic views illustrating widths of coverage of a printing material on a calibration pattern according to an embodiment of the disclosure. With reference to Table 1 and FIGS. 5A to 5D, details regarding how the control unit 180 calibrates the printing speed in response to the width of coverage of the printing material on the calibration pattern 160 are described in the following.

Figure 5A:
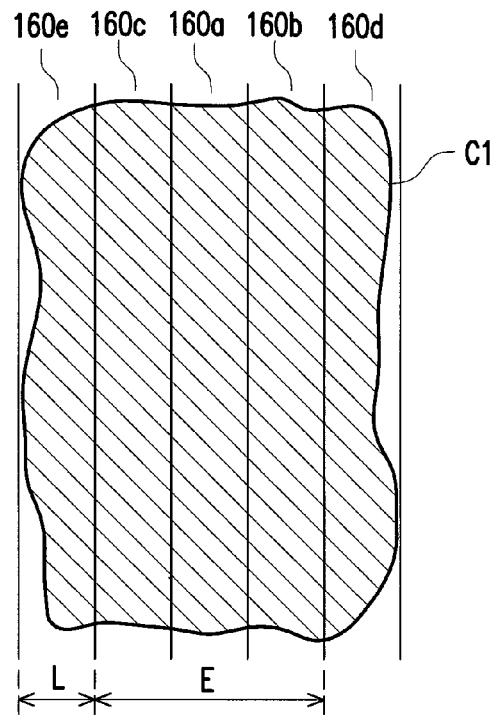
FIGS. 5A to 5D are schematic views illustrating widths of coverage of a printing material on a calibration pattern according to an embodiment of the disclosure.

In the embodiment shown in FIGS. 5A to 5D, the calibration pattern 160 is in the form of the calibration pattern 160 shown in the embodiment of FIG. 3A. In addition, the widths of the datum path 160a, the first auxiliary path 160b, the second auxiliary path 160c, the third auxiliary path 160d, and the fourth auxiliary path 160e are a predetermined width L. In addition, the initial nozzle moving speed is M3, and the initial material supplying speed is S3. Referring to FIG. 5A, in this embodiment, when a width of coverage C1 of the printing material on the calibration pattern 160 exceeds an expected printing width E by at least one unit of the predetermined width L, the initial (or current) nozzle moving speed M3 may be too slow or the initial (or current) material supplying speed S3 may be too fast. Therefore, the control unit 180 may calibrate the printing speed by at least one of increasing the nozzle moving speed and decreasing the material supplying speed. For example, the control unit 180 may only adjust the nozzle moving speed, causing the nozzle moving speed to be increased from M3 to M4 or M5. Besides, the control unit 180 may only adjust the material supplying speed, causing the material supplying speed to be decreased from S3 to S2 or S1. In addition, the control unit 180 may adjust the nozzle moving speed and the material supplying speed at the same time, causing the nozzle moving speed to be increased to M4 or M5, and causing the material supplying speed to be decreased from S3 to S2 or S1.

It should be noted that, in the embodiment shown in FIGS. 5A to 5D, the expected printing width is set as three units of the predetermined width L (i.e. a total of the widths of the datum path 160a, the first auxiliary path 160b, and the second auxiliary path 160c). However, the disclosure is not limited thereto. The expected printing width may be adjusted based on the needs in practice.

Figure 5B:
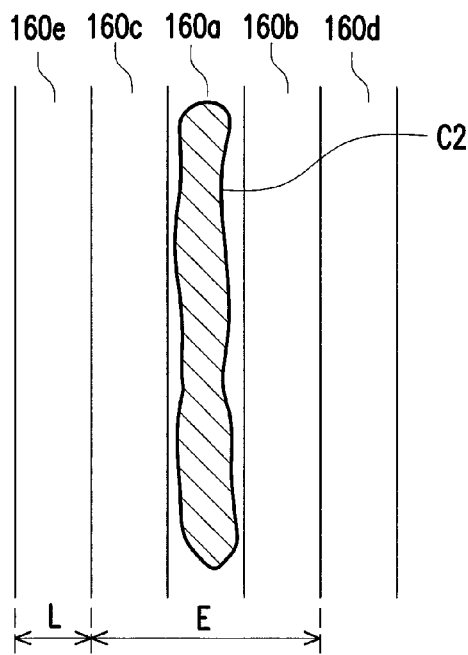

Referring to FIG. 5B, in this embodiment, when a width of coverage C2 of the printing material on the calibration pattern 160 falls short of the expected printing width E by at least one unit of the predetermined width L, the initial (or current) nozzle moving speed M3 may be too fast or the initial (or current) material supplying speed S3 may be too slow. Therefore, the control unit 180 may calibrate the printing speed by at least one of decreasing the nozzle moving speed and increasing the material supplying speed. For example, the control unit 180 may only adjust the nozzle moving speed, causing the nozzle moving speed to be decreased from M3 to M2 or M1. Besides, the control unit 180 may only adjust the material supplying speed, causing the material supplying speed to be increased from S3 to S4 or S5. In addition, the control unit 180 may adjust the nozzle moving speed and the material supplying speed at the same time, causing the nozzle moving speed to be decreased to M2 or M1, and causing the material supplying speed to be increased from S3 to S4 or S5.

Figure 5C:
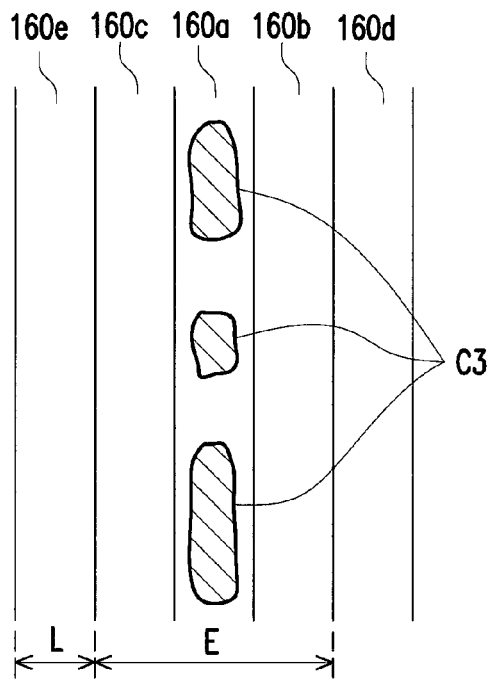
Figure 5D:
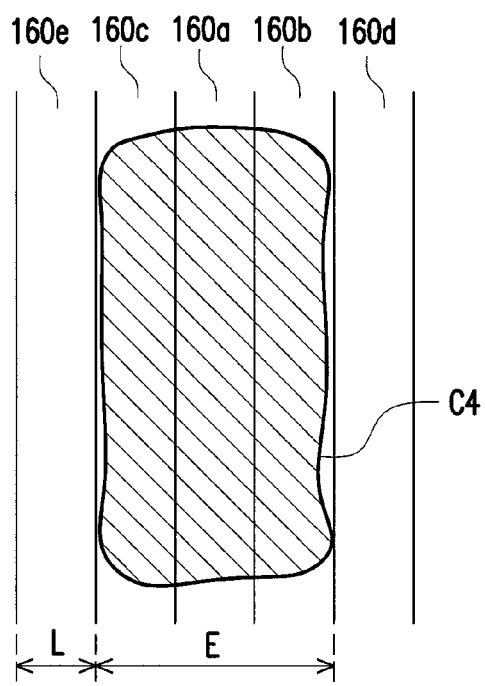

Referring to FIG. 5C, in this embodiment, since the printing material is not output continuously, a width of coverage C3 of the printing material on the calibration pattern 160 also falls short of the expected printing width E by at least one unit of the predetermined with L. At this time, the control unit 180 may also calibrate the printing speed by at least one of decreasing the nozzle moving speed and increasing the material supplying speed. Details with respect to how the nozzle moving speed and the material supplying speed are adjusted may be referred to the embodiment shown in FIG. 5B. Therefore, no further details in this respect will be described below. Referring to FIG. 5D, in this embodiment, a width of coverage C4 of the printing material on the calibration pattern 160 does not exceed or fall short of the expected printing width E by at least one unit of the predetermined width L. In other words, the printing speed is appropriate in general, and it is not necessary to adjust the nozzle printing speed or increase the material supplying speed to calibrate the printing speed.

Based on the embodiment shown in FIGS. 5A to 5D, it can be known that the printing error caused by the viscosity of the printing material may be calibrated by adjusting the nozzle moving speed and the material supplying speed. However, in another embodiment of the disclosure, if the printing material is too thick or too thin, making the width of coverage of the printing material on the calibration pattern 160 unable to meet the expected printing width E no matter how the nozzle moving speed and the material supplying speed are adjusted, the control unit 180 may directly stop the operation of the nozzle module 140 or even the operation of the three-dimensional printing apparatus 100.

Specifically, when the width of coverage of the printing material on the calibration pattern 160 exceeds the expected printing width E by at least one unit of the predetermined width L, and the nozzle moving speed is no longer allowed to be increased (e.g. when the nozzle moving speed is M5) while the material supplying speed is no longer allowed to be decreased (e.g. when the material supplying speed is S1), the control unit 180 stops the nozzle module 140 from further spraying the printing material. Also, when the width of coverage of the printing material on the calibration pattern 160 falls short of the expected printing width E by at least one unit of the predetermined width L, and the nozzle moving speed is no longer allowed to be further decreased (e.g. when the nozzle moving speed is M1) while the material supplying speed is no longer allowed to be further increased (e.g. when the material supplying speed is S5), the control unit 180 also stops the nozzle module 140 from further spraying the printing material.

Based on the embodiment above, it can be known that the control unit 180 mainly determines whether and how to calibrate the printing speed in response to the width of coverage of the printing material on the calibration pattern 160. The design that the calibration pattern 160 has a plurality of paths helps compare the dimensional relation between the width of coverage of the printing material on the calibration pattern 160 and the expected printing width. In another embodiment of the disclosure, the three-dimensional printing apparatus 100 further includes an identification module (not shown). The identification module determines the width of coverage of the printing material on the calibration pattern 160 and transmits an outcome of identification to the control unit 180. For example, the identification module includes a camera unit and an image analysis module. The identification module analyzes the width of coverage of the printing material on the calibration pattern 160 and returns the outcome of identification to the control unit 180. The control unit 180 then adjusts and calibrates the printing speed of the nozzle module based on the outcome of identification.

Figure 6:
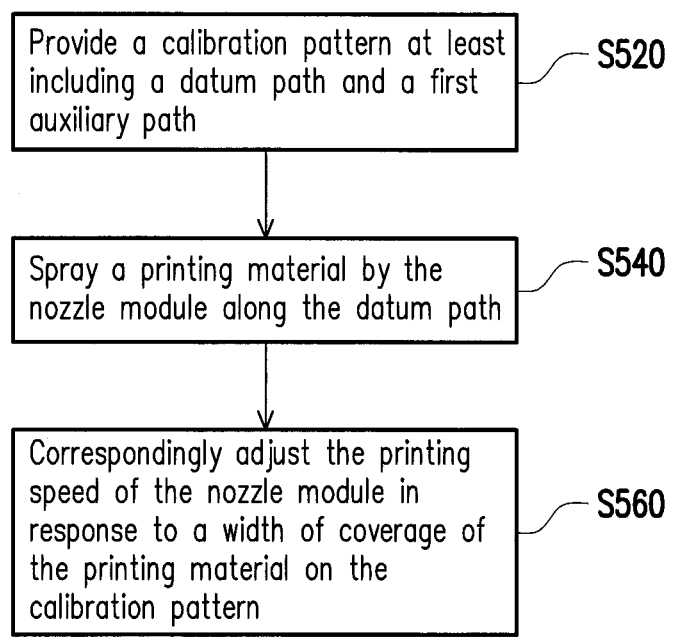
FIG. 6 is a flow chart illustrating a three-dimensional printing calibration method according to an embodiment of the disclosure.

FIG. 6 is a flow chart illustrating a three-dimensional printing calibration method according to an embodiment of the disclosure. Referring to FIG. 6 and FIGS. 1-5D, the three-dimensional printing calibration method is adapted to calibrate a printing speed of a nozzle module. The method includes steps as follows: At Step S520, a calibration pattern is provided. The calibration pattern at least includes a datum path and a first auxiliary path. At Step 540, a printing material is sprayed by the nozzle module along the datum path. Lastly, at Step 560, the printing speed is correspondingly calibrated in response to a width of coverage of the printing material on the calibration pattern.

More specifically, in this embodiment, the method for calibrating the printing speed of the nozzle module is to adjust at least one of a nozzle moving speed of the nozzle module and a material supplying speed of the printing material to calibrate the printing speed. When the width of coverage of the printing material on the calibration pattern exceeds an expected printing width by at least one unit of a predetermined width, the printing speed is calibrated by at least one of increasing the nozzle moving speed and decreasing the material supplying speed. On the contrary, when the width of coverage of the printing material on the calibration pattern falls short of the expected printing width by at least one unit of a predetermined width, the control unit calibrates the printing speed by at least one of decreasing the nozzle moving speed and increasing the material supplying speed.

It should be noted that in an embodiment of the disclosure, a width of each of the paths may be the predetermined width, and the expected printing width is set to be three units of the predetermined width. However, the disclosure is not limited thereto. Details with respect to the operational procedure and setting of the method for three-dimensional printing calibration may be referred to the detailed description about the three-dimensional apparatus, and no further details in this respect will be described below.

In view of the foregoing, in the disclosure, the three-dimensional printing apparatus may adjust the printing speed in response to the width of coverage of the printing material on the calibration pattern by spraying the printing material on the calibration pattern. Through test-printing, the three-dimensional printing apparatus may choose the appropriate printing speed based on the viscosity of the printing material. In this way, the printing quality is maintained. In other words, when the printing quality of the three-dimensional printing apparatus is not preferable, the printing quality of the three-dimensional printing apparatus may be improved by adjusting the printing speed or the viscosity of the printing material. If the three-dimensional printing apparatus is a food printer, the three-dimensional printing apparatus is able to correspondingly choose the appropriate printing speed when the user provides edible materials having different viscosities. In this way, the printed object may be prevented from being distorted, and the three-dimensional printing quality is thus improved.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A three-dimensional printing apparatus adapted for spraying a printing material, the three-dimensional printing apparatus comprises:
   a nozzle module;
   a printing platform, having a carrying surface, wherein a calibration pattern is disposed on the carrying surface, and the calibration pattern at least comprises a datum path and a first auxiliary path, and wherein a first datum line and a second datum line are arranged to be spaced with a distance to form the datum path, and a first auxiliary line is arranged to be spaced with a distance from one side of the datum path to form the first auxiliary path; and
   a control unit, coupled to the nozzle module, wherein the control unit controls the nozzle module to spray the printing material along the datum path, and correspondingly adjusts a printing speed of the nozzle module in response to a width of coverage of the printing material on the calibration pattern;
   wherein in response to the width of coverage, the control unit adjusts at least one of a nozzle moving speed of the nozzle module and a material supplying speed of the printing material to correspondingly adjust the printing speed of the nozzle module.

2. The three-dimensional printing apparatus as claimed in claim 1, wherein a second auxiliary line is arranged to be spaced with a distance from the other side of the datum path to form a second auxiliary path, a third auxiliary line is arranged on one side of the first auxiliary path to form a third auxiliary path, and a fourth auxiliary line is arranged on one side of the second auxiliary path to form a fourth auxiliary path.

3. The three-dimensional printing apparatus as claimed in claim 1, wherein a second auxiliary line is arranged to be spaced with a distance from one side of the first auxiliary path to form the second auxiliary path, and the datum path is arranged on the other side of the first auxiliary path while the second auxiliary path is arranged on the one side of the first auxiliary path.

4. The three-dimensional printing apparatus as claimed in claim 1, wherein the calibration pattern is concentrically arranged circular patterns, concentrically arranged rectangular patterns, concentrically arranged triangular patterns or concentrically arranged irregular patterns at least formed of the datum path and the first auxiliary path.

5. The three-dimensional printing apparatus as claimed in claim 1, further comprising an identification module, wherein the identification module determines the width of coverage of the printing material on the calibration pattern and transmits an outcome of identification to the control unit, and the control unit correspondingly adjusts the printing speed of the nozzle module based on the outcome of identification.

6. A printing calibration board adapted to be configured with a nozzle module that sprays a printing material, the printing calibration board comprising:
a substrate; and
a calibration pattern, disposed on the substrate, wherein the calibration pattern at least comprises a datum path and a first auxiliary path, wherein a first datum line and a second datum line are arranged to be spaced with a distance to form the datum path, a first auxiliary line is arranged to be spaced with a distance from one side of the datum path to form the first auxiliary path, and the nozzle module sprays the printing material along the datum path and the first auxiliary path to present a width of coverage;
wherein in response to the width of coverage, a control unit adjusts at least one of a nozzle moving speed of the nozzle module and a material supplying speed of the printing material to correspondingly adjust the printing speed of the nozzle module.

7. The printing calibration board as claimed in claim 6, wherein a second auxiliary line is arranged to be spaced with a distance from the other side of the datum path to form a second auxiliary path, a third auxiliary line is arranged to be spaced with a distance from one side of the first auxiliary path to form a third auxiliary path, a fourth auxiliary line is arranged to be spaced with a distance from one side of the second auxiliary path to form a fourth auxiliary path, and the nozzle module sprays the printing material along the datum path, the first auxiliary path, the second auxiliary path, the third auxiliary path, and the fourth auxiliary path to present the width of coverage.

8. The printing calibration board as claimed in claim 6, wherein a second auxiliary line is arranged to be spaced with a distance from one side of the first auxiliary path to form a second auxiliary path, the datum path is arranged on the other side of the first auxiliary path while the second auxiliary path is arranged on the one side of the first auxiliary path, and the nozzle module sprays the printing material along the datum path, the first auxiliary path, and the second auxiliary path to present the width of coverage.

9. The printing calibration board as claimed in claim 6, wherein the calibration pattern is concentrically arranged circular patterns, concentrically arranged rectangular patterns, concentrically arranged triangular patterns or concentrically arranged irregular patterns at least formed of the datum path and the first auxiliary path.

10. The printing calibration board as claimed in claim 6, wherein the substrate is disposed on a carrying surface of a printing platform of a three-dimensional printing apparatus.

11. A three-dimensional printing calibration method adapted for calibrating a printing speed of a nozzle module, the three-dimensional printing calibration method comprising:
providing a calibration pattern at least comprising a datum path and a first auxiliary path;
spraying a printing material by the nozzle module along the datum path;
correspondingly adjusting the printing speed of the nozzle module in response to a width of coverage of the printing material on the calibration pattern by adjusting at least one of a nozzle moving speed of the nozzle module and a material supplying speed of the printing material.

12. The three-dimensional printing calibration method as claimed in claim 11, wherein the step of correspondingly adjusting the printing speed of the nozzle module in response to the width of coverage of the printing material on the calibration pattern further comprises:
when the width of coverage of the printing material on the calibration pattern exceeds an expected printing width by at least one unit of a predetermined width, correspondingly adjusting the printing speed of the nozzle module by at least one of increasing the nozzle moving speed and decreasing the material supplying speed;
when the width of coverage of the printing material on the calibration pattern falls short of the expected printing width by at least one unit of the predetermined width, correspondingly adjusting the printing speed of the nozzle module by at least one of decreasing the nozzle moving speed and increasing the material supplying speed;
when the width of coverage of the printing material on the calibration pattern exceeds the expected printing width by at least one unit of the predetermined with, and the nozzle moving speed is not allowed to be increased and the material supplying speed is not allowed to be decreased, stopping the nozzle module from spraying the printing material; and when the width of coverage of the printing material on the calibration pattern falls short of the expected printing width by at least one unit of the predetermined with, and the nozzle moving speed is not allowed to be decreased and the material supplying speed is not allowed to be increased, stopping the nozzle module from spraying the printing material.

13. The three-dimensional printing calibration method as claimed in claim 12, further comprising:
determining the width of coverage of the printing material on the calibration pattern and generating an outcome of identification by performing an identification process, and correspondingly adjusting the printing speed of the nozzle module based on the outcome of identification.

\* \* \* \* \*